United States Patent [19]

Nohmi et al.

[11] 4,229,297

[45] Oct. 21, 1980

[54] METHOD OF SEPARATING OIL FROM OIL-CONTAINING LIQUID

[75] Inventors: Takashi Nohmi; Takao Yamada, both of Fuji; Yoshinao Doi, Kawasaki, all of Japan

[73] Assignee: Asahi Kasei Kogyo Kabushiki Kaisha, Osaka, Japan

[21] Appl. No.: 2,028

[22] Filed: Jan. 9, 1979

[30] Foreign Application Priority Data

Jan. 10, 1978 [JP] Japan .................................. 53/863
Dec. 13, 1978 [JP] Japan .............................. 53/153009

[51] Int. Cl.$^2$ ......................... B01D 37/00; B01D 13/0
[52] U.S. Cl. ............................. 210/654; 210/500 M; 210/DIG. 5
[58] Field of Search ............. 210/23 R, 500 M, 73 W, 210/500 R, DIG. 5, 40, 242 S

[56] References Cited

U.S. PATENT DOCUMENTS

| | | | |
|---|---|---|---|
| 3,478,874 | 11/1969 | McLean et al. | 210/73 W |
| 3,537,587 | 11/1970 | Kain | 210/242 S |
| 3,617,566 | 11/1971 | Oshima | 210/DIG. 26 P |
| 3,667,608 | 6/1972 | Burroughs et al. | 210/DIG. 26 P |
| 3,679,058 | 7/1972 | Smith | 210/DIG. 26 P |
| 3,744,638 | 7/1973 | Rhodes | 210/DIG. 26 P |
| 3,748,632 | 7/1973 | Rhodes | 210/DIG. 26 P |
| 3,764,527 | 10/1973 | Sohl | 210/DIG. 26 |
| 3,810,832 | 5/1974 | Rhodes | 210/DIG. 26 P |
| 4,073,143 | 2/1978 | Preus | 210/DIG. 25 |
| 4,124,981 | 11/1978 | Preus | 210/DIG. 25 |

FOREIGN PATENT DOCUMENTS

2804169 8/1978 Fed. Rep. of Germany .... 210/DIG. 5
49-127873 12/1974 Japan .
51-38303 3/1976 Japan .

OTHER PUBLICATIONS

Transactions ASAIO, vol. XI, 1965, pp. 301-306, Lyman et al.

*Primary Examiner*—Charles N. Hart
*Assistant Examiner*—E. Rollins Cross
*Attorney, Agent, or Firm*—Finnegan, Henderson, Farabow, Garrett & Dunner

[57] ABSTRACT

A specific porous membrane is found to be extremely useful for permeation-separation of an oil from an oil-containing emulsion. By contacting a stable oil-containing emulsion of either water-in-oil type or oil-in-water type with the surface of a specific porous membrane having at its surface a critical surface tension of less than 35 dynes/cm to not less than 20 dynes/cm and having an average pore diameter of 0.03 $\mu$m to 5 $\mu$m, a pore radius distribution of not more than 1.5 and a porosity of 1 to 85%, only the oil can be permeation-separated, without permeation of the liquid immiscible with the oil, with high selectivity and high oil permeation.

10 Claims, No Drawings

METHOD OF SEPARATING OIL FROM OIL-CONTAINING LIQUID

This invention relates to a method for separating an oil from an oil-containing liquid. More particularly, the present invention is concerned with a method for selectively permeation-separating an oil from an oil-containing liquid by contacting the oil-containing liquid with the surface of a porous membrane.

Recently, in factories, equipments and the like in which an oil is used, there is such an increasing problem that the treatment of an oil-containing waste water and the treatment of a spent oil cause environmental pollution.

In general, considerable quantities of heavy oil, fuel oil, Diesel oil and lubricating oil are contained in oil substances floating on the sea, a waste water accumulated in the vessel bottom of a ship, and a standing water in or a drain water from the oil tank, the ballast tank and the engine room in a ship. In waste waters discharged from the factories of petrochemical industries and machine industries are contained large quantities of oil. For the purpose of preventing environmental pollution including oil pollution of sea water, there have heretofore been proposed many kinds of methods of removing the oil contained in waste waters and spent waters.

The conventionally proposed methods, however, are almost directed to separation-recovery of clear water from the waste water of which the oil content is relatively small. Therefore, the concentrated oil materials obtained by the conventional methods usually contain relatively large quantities of water and other impurities, and cannot be re-utilized but are usually burnt out with fuel materials.

On the other hand, there is disclosed, in Japanese patent application laid-open specification No. 131476/1976, a method of separating an oil through causing the particle diameters of the dispersed oil particles to be changed by means of a porous film. The method, however, is not practically applicable where the oil content in the waste liquid is large. Furthermore, where a surface active agent is present in the waste liquid to be treated, the separation rate of oil particles is extremely lowered and the water content in the separated oil liquid is increased. Therefore, in order to selectively obtain only an oil, it is necessary to subject the once separated oil liquid to further separation procedures by gravity-separation, centrifugal separation, adsorption separation or the like.

Furthermore, there is rarely available a method for easily and economically separation-recovering an oil from a much oil-containing waste liquid or spent oil discharged in the factories of petrochemical industries and machine industries by removing water and other solvents therefrom, or from an oil-containing solvent waste produced as a result of washing the apparatus or machines with a solvent by removing the solvent therefrom. The term "spent oil" is used herein to mean used oils such as petrochemical products, fuel oil, natural lubricating oil, synthetic lubricating oil and the like employed in and discharged from the mechanical apparatus, internal combustion engine devices and the like. Especially as to the case where a surface active agent is present in an oil-containing waste liquid, there is not known any method for selectively recovering an oil from the waste liquid.

As to a method for separation-recovering an oil from oil-containing waste liquids, there is known a technique of reclaiming a spent oil containing impurities (including water) by means of an osmosis membrane as disclosed in, for example, Japanese patent application laid-open specifications Nos. 4464/1976, 125171/1975, 40882/1974 and 38303/1976, or by means of an ultrafiltration membrane having pores of a pore diameter of less than 100 Å. However, when such a technique applies to an oil-containing liquid in which a large quantity of water and a surface active agent are present, not only the permeation-separation rate of oil is extremely lowered but also there is disadvantageously observed clogging of pores because the separation operation is conducted under high pressure.

Further, Japanese patent application publication No. 13005/1969 discloses a method of separating a mixture of mutually insoluble two liquids into the component liquids. As different from a porous membrane such as a film and a hollow fiber, the separating material employed in the method is, for example, a paper or a porous material having a pore diameter larger than that of the porous resin membrane. The method is effective only for a liquid dispersion that, when it is allowed to stand, will be easily separated into two phases, due to formation, on the surface of the separating material, of a thick layer of a liquid constituting one component of the dispersion and having a relatively small surface tension. When the method applies to a stable water-oil emulsion in which there are present fine liquid particles having a diameter as small as less than $50\mu$, a part of the water passes through the separating material together with the oil, so that separation between the oil and water is insufficient. The representative separating material employed in the prior art method is of polytetrafluoroethylene. The critical surface tension of polytetrafluoroethylene is 18 dynes/cm and small as compared with that of an oil (about 22 to about 35 dynes/cm) and, hence, has poor wettability for the oil, so that the oil permeability is disadvantageously low.

As described above, there is not known any method of selectively separating an oil from an oil-containing liquid with high selectivity for the oil.

With a view to developing a new technique for effectively permeation-recovering an oil from an oil-containing liquid, the present inventors have made extensive and intensive investigations. As a result, it has been found that, by the use of a specific porous membrane, an oil can be selectively permeation-separated from a stable emulsion comprising an oil and a liquid other than the oil and optionally a surface active agent, with high selectivity and at high oil permeation. The oil thus separation-recovered is highly pure and, hence, can advantageously be re-utilized as an oil, as different from the conventional case where the concentrated oil material obtained by the water-recovering method is burnt out. Therefore, a principal object of the present invention is to provide a method of separating an oil from a stable oil-containing emulsion by means of a porous membrane, with high selectivity and at high oil permeation.

Another object of the present invention is to provide a method of the above character, which is useful for regeneration of a spent oil and for recovering the oil from an oil-containing waste liquid.

The foregoing and other objects, features and advantages of the present invention will be apparent to those skilled in the art from the following detailed description and appended claims.

According to the present invention, there is provided a method of selectively permeation-separating an oil from an oil-containing liquid which comprises: contacting an oil-containing liquid selected from a water-in-oil type emulsion comprising an oil and a liquid other than the oil and optionally a surface active agent, and an oil-in-water type emulsion comprising an oil and a liquid other than the oil with the surface of a porous membrane having pores which form passages running through the membrane from one surface thereof to the other surface thereof, said porous membrane having at its surface a critical surface tension ($\gamma_c$) of less than 35 dynes/cm to not less than 200 dynes/cm, and having an average pore diameter ($2\bar{r}$) of 0.03 μm to 5 μm, a pore radius distribution ($\bar{r}_4/\bar{r}_3$) of not more than 1.5 and a porosity of 1 to 85%, the average pore radius of the porous membrane ($\bar{r}$) and the average particle radius ($\bar{r}_E$) of particles dispersed in the water-in-oil type emulsion or the oil-in-water type emulsion having therebetween a relationship represented by the formula $2\bar{r}_E \geq \bar{r}$.

The oil-containing liquid to be treated by the method of the present invention comprises an oil and a liquid immiscible with the oil.

As the oil, there can be mentioned those generally called an oil, such as machine oil, gear oil, cylinder oil, animal oil, vegetable oil, kerosine, gas oil, fluorine oil, silicone oil and the like. In the present invention, besides the above-mentioned oils, other oily substances are included in the category of "oil", that is, for example, liquid ethers; aliphatic liquid hydrocarbons such as n-hexane, n-pentane and the like, cyclic liquid hydrocarbons such as cyclohexane, cyclopentane, liquid paraffin and the like; and aromatic hydrocarbons such as benzene, toluene, xylene and the like.

As the liquid immiscible with the oil, there can be mentioned water; aqueous solutions of metal salts such as sodium chloride, lithium chloride, calcium chloride and the like; organic solvents such as methanol, ethanol, butane diol, N-dimethylacetamide, dimethylformamide, acetonitrile and the like; and mixtures of water with the above-mentioned solvents.

In the method of the present invention, it is preferred that at least one kind of oil and at least one kind of liquid immiscible with the oil be present in the form of a stable emulsion. However, in the method of the present invention, a mixture of the oil and the liquid immiscible with the oil may be employed as far as they are capable of forming an emulsion by, for example, agitation at the time of treating the mixture by means of a porous membrane. The emulsion may be either of such a water-in-oil type (W/O type) that in an oil is dispersed a liquid immiscible with the oil or of such an oil-in-water type (O/W type) that an oil is dispersed in a liquid immiscible with the oil. As described, in the present invention, the term "water" used for the definition of types of emulsion is, of course, not limited to water but is intended to include other liquids immiscible with the so-called oil. Accordingly, the terms "water-in-oil type emulsion" and "oil-in-water type emulsion" are used herein to mean an emulsion which is apparently observed as a W/O type and an emulsion which is apparently observed as of an O/W type, respectively. For determining the type of an emulsion, there can be employed various methods as described in, for example, "JIKKEN KAGAKU KOZA (Lectures on Chemical Experiments)" Vol. 7 (Chemistry of Interface), p218–221 (1961) edited by Chemical Society of Japan and published by Maruzen Kabushiki Kaisha, Japan.

Where the emulsion is of a water-in-oil type, there may be present a surface active agent in an amount such as will render the emulsion stable but not destroy the state of emulsion. The suitable amount of the surface active agent varies depending on the kind of each of the oil, the liquid other than the oil and the surface active agent employed, but may preferably be up to 10% by weight based on the oil-containing liquid. It is not preferred to employ too large an amount of surface active agent because the surface active agent forms micelles, causing the critical surface tension of the porous membrane surface to be changed at the time of treatment of the liquid. The surface active agents employable in the method of the present invention include those of cationic type, those of anionic type, those of amphoteric type and those of nonionic type. With respect to oil-in-water type emulsions, it is not preferred to employ a surface active agent because the use of a surface active agent causes the critical surface tension of the porous membrane surface to be changed at the time of treatment of the liquid. The method of the present invention is applicable even though the oil-containing liquid to be treated contains solid materials such as iron powder, copper powder and the like.

The particle radius of particles dispersed in the emulsion is preferably within the range of 0.1 μm to 50 μm. In case the particle radius of particles is 1 μm or more, it is measured by visual observation using an optical microscope, whereas in case the particle radius is less than 1 μm, it is measured by a light scattering method.

The temperature of the oil-containing liquid to be treated is not critical, but it is preferred to contact the oil-containing liquid with the surface of the porous membrane at a temperature 10° C. or more lower than the boiling point of the oil of the liquid other than the oil, whichever is lower, provided that the temperature is within 35° to 90° C. The higher the temperature within the range as defined above, the more active the movement of the particles in the emulsion in the vicinity of the pores of the porous membrane.

The porous membrane to be employed in the method of the present invention necessarily has, at its surface to be contacted with an oil-containing liquid, a critical surface tension of less than 35 dynes/cm to not less than 20 dynes/cm, more preferably not more than 33 dynes/cm to not less than 20 dynes/cm. As such a porous membrane, there may be employed porous membranes made of one class of resin having a critical surface tension of less than 35 dynes/cm to not less than 20 dynes/cm. There may also be employed porous membranes made of blend polymer or copolymer of two or more classes of components. In the latter case, as far as the finished porous membranes having a critical surface tension of less than 35 dynes/cm to not less than 20 dynes/cm, some component resin need not have a specific value of critical surface tension as defined above. Further, it is also possible to obtain a desired porous membrane having the above-specified critical surface tension by modifying the surface of a porous membrane with chemical species by means of coating or chemical binding. Illustrative examples of materials employable for obtaining desired porous membranes include polyolefins such as polyethylene, polypropylene, polybutene, polyisobutylene, polypentene, poly(4-methylisopentene) and their halogensubstituted derivatives having at least one fluorine atom: polycarbonate: polyphenylene oxide: polystyrene and a halogenated polystyrene having at least one fluorine atom: copolymers of ethylenically unsaturated hydrocarbons and/or halogen-substituted ethylenically unsaturated hydrocarbons having at least one fluorine atom, said ethylenically unsaturated hydrocarbons and their halogen-substituted derivatives including ethylene, propylene, butene, isobutylene, pentene, hexene, monofluoroethylene, vinylidene fluoride, trifluoroethylene, tetrafluoroethylene, trifluorochloroethylene, hexafluoropropylene and the like: and blend polymers such as a combination of polyethylene with polypropylene, polyvinylidene fluoride, polytetrafluoroethylene or polystyrene; a combination of polypropylene with polyvinylidene fluoride or polytetrafluoroethylene; a combination of polyvinylidene fluoride with polysulfone, polyacrylonitrile, polyphenylene oxide or polytetrafluoroethylene; and the like. Preferred examples of materials employable for desired porous membranes include resins containing, as a main component, polyethylene, a halogenated polyethylene having at least one fluorine atom, polypropylene, a halogenated polypropylene having at least one fluorine atom, polycarbonate or polyphenylene oxide; or copolymers of two or three kinds of monomers selected from ethylene, propylene and tetrafluoroethylene. It is noted that where a plurality of components having different critical surface tensions are combined, the more the proportion of the component having a lower critical surface tension, the lower the critical surface tension of the entire polymer becomes.

The value of a critical surface tension is measured as follows. Where the porous membrane is made of homogeneous material, a non-porous membrane is produced using the same material and used as a sample for the measurement. Where the porous membrane is not made of homogeneous material but modified, on its surface, with chemical species by means of coating or chemical binding, a non-porous membrane is produced using the same material and then modified, on its surface, with chemical species under the same conditions as employed for production of the surface modified porous membrane to provide a sample for the measurement. The critical surface tension ($\gamma_c$) is defined to be a surface tension which would be exerted if the contact angle $\theta$ is equal to 0°. The sample prepared by the method as mentioned above is measured with respect to contact angle, using liquids having a varied surface tension, and a surface tension which would be exerted if the contact angle $\theta$ is equal to 0°, is calculated by extrapolation. The value thus obtained is that of the critical surface tension.

In general, the critical surface tension of an oil is within the range of 20 to 35 dynes/cm. Accordingly, where the porous membrane surface to be contacted with an oil-containing liquid is made of a resin having the value of critical surface tension as mentioned above, the membrane surface is well wetted with the oil, and, hence, the porous membrane has an increased oil permeability. Whereas, where the porous membrane surface is made of a resin having the value of critical surface tension lower than that mentioned above, the surface repulses the oil, and, hence, the porous membrane has poor oil permeability. The values of critical surface tension with respect to some resin materials are shown below.

| | |
|---|---|
| Polyethylene (density = 0.95) | $\gamma_c$ = 31 dynes/cm |

-continued

| | |
|---|---|
| polypropylene | $\gamma_c$ = 29.0 dynes/cm |
| Polystyrene | $\gamma_c$ = 33.0 dynes/cm |
| Polyvinylidene fluoride | $\gamma_c$ = 25.0 dynes/cm |
| Polycarbonate | $\gamma_c$ = 34.5 dynes/cm |
| Acrylonitrile-butadiene copolymer | $\gamma_c$ = 37.0 dynes/cm |
| [refer to J. Poly. Sci., A$_2$, Vol. 5, p1103 (1967), L. H. Lee] | |
| Polyacrylonitrile | $\gamma_c$ = 44.0 dynes/cm |
| Tetrafluoroethylene | $\gamma_c$ = 18.5 dynes/cm |

The average pore diameter ($2\bar{r}$) of the porous membrane is 0.03 μm to 5 μm, preferably 0.05 μm to 1 μm. When the porous membrane having an average diameter pore of less than 0.03 μm is employed, the oil permeability of the membrane is poor, causing the pores to be often clogged. When the porous membrane having an average pore diameter of more than 5 μm is employed, the water and/or the liquid other than the oil, and the surface active agent if any, will readily permeate through the porous membrane, thereby contaminating the oil to be selectively recovered.

The average pore radius ($\bar{r}$) is represented by the formula $$\bar{r} = [8Q\eta d/(\Delta P \cdot P_r)]^{\frac{1}{2}}$$

wherein
Q is a liquid permeability of the porous membrane, cm$^3$/cm$^2$.sec;
$\eta$ is a viscosity of the liquid, poise;
d is a thickness of the porous membrane, cm;
$\Delta P$ is a pressure difference between on one surface and on the other surface of the porous membrane, dyne/cm$^2$; and
$P_r$ is a porosity of the porous membrane, %.

A still further element requisite to the method of the present invention is a relationship between the average particle radius ($\bar{r}_E$) of the particles dispersed in the emulsion and the average pore radius ($\bar{r}$) of the porous membrane. According to the method of the present invention, the relationship between the average particle radius ($\bar{r}_E$) and the average pore radius ($\bar{r}$) should satisfy the formula $2\bar{r}_E \geq \bar{r}$, preferably the formula $\bar{r}_E \geq \bar{r}$, more preferably the formula $0.5 \bar{r}_E \geq \bar{r}$. By the use of a porous membrane satisfying such a relationship represented by the above-formula, the oil alone can be more effectively recovered by selective permeation through the porous membrane.

The pore radius distribution in the porous membrane to be employed in the method of the present invention is preferably as narrow as possible. Illustratively stated, the ratio $\bar{r}_4/\bar{r}_3$ represents a pore radius distribution and is 1.5 or less, preferably 1.3 or less. The $\bar{r}_3$ and $\bar{r}_4$ are respectively represented by the formulae $$\bar{r}_3 = \int r^3 N(r)dr / \int r^2 N(r)dr$$

$$\bar{r}_4 = \int r^4 N(r)dr / \int r^3 N(r)dr$$

wherein
r is the pore radius in the surface of the porous membrane; and
N(r) is a pore radius distribution function and is defined to give the number of pores having a pore radius falling within the range of r to r+dr.
The values of r and N(r) are obtained by visual observation using a scanning electron microscope.

As the simple method of determining the pore radius distribution ($\bar{r}_4/\bar{r}_3$), besides the method by visual observation using a scanning electron microscope, there can be mentioned a method as described in "Kobunshi Ronbun Shu (Collected theses on polymers)" Vol. 34, No. 10, p 737 (1977), published by The Society of Polymer Science, Japan. According to this method, through the measurement of gas permeation, $X_3$ and $X_4$ are obtained from the term of free molecular flow and the term of viscous flow, respectively (wherein $Xi = \int r^i N(r) dr$). $\bar{r}_4$ can be calculated from the formula $\bar{r}_4 = X_4/X_3$. In addition, utilizing the porosity of the porous membrane and the phenomenon that when a salt in the aqueous solution is diffusion-permeated into the porous membrane the salt will permeate through the pores by self-diffusion, $X_2$ is obtained, from the following equation, using the permeation quantity (J) of the salt:

$$J = \pi \cdot X_2 \cdot D_s (dc/dx)$$

wherein $D_s$ is a self-diffusion coefficient;
c is a concentration of the salt; and
x is a distance from the surface of the porous membrane.

$\bar{r}_3$ can be calculated from $X_3/X_2$. Accordingly, the pore radius distribution ($\bar{r}_4/\bar{r}_3$) can be obtained by other method than the method by visual observation using a scanning electron microscope. Meanwhile, the value of $X_4$ can be obtained also by assuming a viscous flow (Hagen-Poiseuille's flow) at the time when the liquid permeates through the porous membrane as described in "Kobunshi Ronbun Shut" Vol. 34, No. 4, p 299 (1977), published by the Society of Polymer Science, Japan.

The pores of the porous membrane to be employed in the method of the present invention may be present in various forms but, in overall, form passages running through the membrane from one surface to the other surface, thereby imparting permeability to the membrane. The ratio of the diameter of the pore opening in one surface to that of the pore opening in the other surface (hereinafter referred to as "pore diameter ratio of the pores in both surfaces") is 1 or more, preferably 1.1 or more. With respect to porous membranes having pores of different diameters in one surface and in the other surface, reference may be made to U.S. Pat. No. 3,883,626. As the pore diameter ratio of the pores in both surfaces is increased, the oil permeability is improved. The pore diameter ratio of the pores in both surfaces is a value obtained by dividing the average pore diameter in the surface in which there are pore openings having relatively large diameters by the average pore diameter in the reverse surface. In this connection, it is noted that when the oil-containing liquid is treated by contacting it with the porous membrane, the treatment operation is conducted in such a manner that the oil-containing liquid is contacted with the surface in which there are pores having a relatively small pore diameter and the permeation-separated oil is recovered from the reverse surface.

In the method of the present invention, the more the number of pores per unit area of the porous membrane surfaces, the larger the oil permeability is with advantage. The number of pores in the porous membrane surface is preferably $1 \times 10^7$ to $1 \times 10^{10}/cm^2$.

The porosity of the porous membrane as defined to be a volume fraction of the pores per unit volume of the membrane is within the range of 1 to 85%. The porosity ($P_r$) is obtained by calculation from the formula $$P_r(\%) = (1 - \frac{\rho_b}{\rho_a}) \times 100$$

wherein $\rho_a$ = true specific gravity of the porous membrane
$\rho_b$ = value obtained by dividing the weight of the porous membrane by the volume of the same.

For producing such a porous membrane as mentioned above, there may be employed known methods, for example, a melt-molding method as disclosed in Japanese patent application laid-open specification No. 52-70988. Besides, there may be employed, for example, a microphase-separation method, a stretching method, a neutron beam radiation method and a method in which the membrane produced by the above-mentioned method is subjected to post-treatment such as etching to adjust the pore size.

As to a shape or type of the porous membrane to be employed in the method of the present invention, there can be mentioned a flat film, a hollow fiber, a tube and those reinforced with internally embedded fibers.

In practicing the method of the present invention, the oil-containing liquid is flowed over the surface of the porous membrane so that the oil is caused to permeate through the porous membrane. The linear velocity of flowing the oil-containing liquid may be 1 to 500 cm/sec, preferably 2 to 500 cm/sec. The operating pressure (P) may preferably be within the range as defined by the formula $$P(dynes/cm^2) = 2\sigma \cos \theta / \bar{r}$$

wherein $\sigma$ is a surface tension, with respect to the porous membrane surface, of the liquid immiscible with the oil, dyne/cm; and
$\theta$ is a contact angle, with respect to the porous membrane surface, of the liquid immiscible with the oil.

Preferably, the operating pressure may be 1 to 10 atm. The higher the operating pressure, the better the results are. When the operating pressure is higher than 10 atm, the pores of the porous membrane is readily caused to be clogged. Under the operating pressure lower than 1 atm, the oil permeation is disadvantageously decreased.

As described, according to the present invention, a stable oil-containing emulsion of either water-in-oil type or oil-in-water type is contacted with the surface of a specific porous membrane having at its surface a critical surface tension of less than 35 dynes/cm to not less than 20 dynes/cm and having an average pore diameter of 0.03 μm to 5 μm (preferably 0.05 μm to 5 μm), a pore radius distribution of not more than 1.5 and a porosity of 1 to 85%, whereby even by the porous membrane having a relatively large pore diameter, only the oil can be permeation-separated, without permeation of water and/or the liquid immiscible with the oil, with high selectivity and high oil permeation. The oil thus separation-recovered is clear and, hence, can be re-utilized with great advantage. In this connection, according to the present invention, it is noted that the liquid other than the oil may be contained in the separation-recovered oil in an amount corresponding to the saturation solubility or less. Further, it should be noted that even in the case of a liquid having a composition outside that of the liquid to be treated by the method of the present invention, it can be readily changed to have a composition suitable for the separation-treatment of the present invention by adding thereto an oil or employing other kinds of separation processes in combination with the method of the present invention. Thus, according to the present invention, there is provided an excellent method for economically recovering a large quantity of an oil in a clear state from an oil-containing liquid.

The present invention will now be described in detail with reference to the following Examples that by no means limit the scope of the present invention.

In Examples, the critical surface tension ($\gamma_c$) of the surface of the porous membrane was measured using a contact angle measuring apparatus Model CA-D (manufactured and sold by Kyowa Kagaku K. K. Japan). The symbols "$\overline{M}w$", "$\overline{M}n$", "SLMI" and "SP" mean a weight average molecular weight, a number average molecular weight, a standard load melt index and a solubility parameter, respectively.

EXAMPLE 1

22 Weight percent of SUNTEC S-360P [trade name of polyethylene manufactured and sold by Asahi Kasei Kogyo Kabushiki Kaisha, Japan ($\overline{M}w=85,000$, $\overline{M}n=21,000$, SLMI=1)], 54 weight percent of dioctyl phthalate [DOP (SP: 8.9)] and 24 weight percent of NIPSIL VN-3 [trade name of finely divided silica manufactured and sold by Nippon Silica Industrial Co., Ltd., Japan (specific surface area: 280 m²/g, average diameter of particles: 16 μm)] were mixed in a Henschel mixer. By a twin extruder having a diameter of 30 mm, the blend was kneaded, extruded and pelletized. These pellets were extruded to form a film using a film making apparatus including a twin extruder of 30 mm diameter having a T-die of 450 mm width attached thereto.

The extruded film was immersed in CHLOROTHENE VG (trade name of 1,1,1-trichloroethane manufactured and sold by Asahi Dow Ltd., Japan) for 5 minutes to extract DOP, followed by drying at 85° C. for 2 minutes by the use of a metal roll with a flannel wound therearound. Subsequently, the film was immersed in a 40% aqueous solution of sodium hydroxide at 50° C. for 30 minutes to extract the finely divided silica, followed by drying at 85° C. for 10 minutes by the use of a metal roll with a flannel wound therearound. The amounts of the DOP and the finely divided silica remaining un-extracted from the film were both 0.1 weight percent based on the weight of the film. The shrinkages of the film due to the extraction of the DOP and the finely divided silica were 3.5% in a longitudinal direction (direction of extrusion), 2.3% in a lateral direction and 1.8% in a thicknesswise direction.

The porous film thus obtained has a thickness of 100 μm, a maximum pore diameter of 0.4 μm (as measured according to ASTM E-128), an average pore diameter of 0.15 μm (as measured by visual observation using an electron microscope), a porosity of 66%, a pore radius distribution ($\bar{r}_4/\bar{r}_3$) of 1.3, a $\gamma_c$ of 31 dynes/cm, a water permeability of 41.9 m³/m²·day·atm and a pore diameter ratio of the pores in both surfaces (hereinafter referred to as only "pore diameter ratio") of 1.0.

The porous film was attached to a stirrer-equipped circular filter holder manufactured by Bioengineering Co., Ltd., Japan, and the oil-water separation was conducted under an operating pressure of 0.5 kg/m² while stirring an oil-containing liquid to be treated at a maximum linear velocity of 10 cm/sec (as measured at the peripheral portion of the holder). The oil-containing liquid was an emulsion composed of 90 parts by weight of SUPERHYRANDO 22 (trade name of a machine oil manufactured and sold by Nihon Sekiyu Kabushiki Kaisha, Japan) and 10 parts by weight of water, and the average diameter of the water particles in the emulsion was 1.5 μm as measured by visual observation using an optical microscope. The oil-containing liquid was subjected to oil-water separation by means of the polyethylene porous film at 35° C. The oil permeability of the porous film was 0.5 m³/m²·day·atm. The water content in the separated oil was determined titrimetrically according to Karl Fischer's method and was found to be below the saturation solubility of water in the oil, i.e., below 3 ppm.

COMPARATIVE EXAMPLE 1

The oil-water separation was conducted using the same oil-containing liquid as in Example 1 in substantially the same manner as described in Example 1 except that there was used, in place of the polyethylene porous film as used in Example 1, NUCLEPORE N 080 [trade name of a polycarbonate porous film manufactured and sold by Nuclepore Corp., U.S.A. (thickness=10 μm, maximum pore diameter=2.0 μm, average pore diameter=0.8 μm, porosity=22%, pore radius distribution ($\bar{r}_4/\bar{r}_3$)=1.1, $\gamma_c$=34.5 dynes/cm, water permeability=4,000 m³/m²·day·atm, pore diameter ratio=1.1)]. Both of the oil and water permeated through the polycarbonate porous film.

EXAMPLE 2

A polyethylene hollow fiber porous membrane was prepared in substantially the same manner as described in Example 1 except that a hollow fiber making apparatus including an extruder having an orifice for hollow fiber was used in place of the film making apparatus.

The hollow fiber porous membrane thus obtained had an external diameter of 0.13 cm, a membrane thickness of 200 μm, a maximum pore diameter of 0.35 μm, an average pore diameter of 0.1 μm, a $\gamma_c$ of 31 dynes/cm, a porosity of 62.6%, a pore radius distribution ($\bar{r}_4/\bar{r}_3$) of 1.3, a water permeability of 14.0 m³/m²·day·atm and a pore diameter ratio of 1.0.

Using the polyethylene hollow fiber porous membrane, oil-containing emulsions composed of SUPERHYRANDO 22 and water and having a varied composition as indicated in Table 1 were each subjected to oil-water separation by flowing the emulsions through the hollow fiber at a linear velocity of 50 cm/sec at 35° C. The oil permeated selectively through the porous membrane with respect to all of the oil-containing emulsions. In all cases, the separated oil was transparent and the water content in the separated oil was determined according to Karl Fisher's method (this method was used for determining the water content in the following Examples) and was found to be below the saturation solubility of water in the oil, i.e., below 3 ppm. The materials and results are listed in Table 1.

TABLE 1

| Oil[1] (% by weight) | Water (% by weight) | Type of Emulsion | Average Diameter of Emulsion Particles (μm) | Oil Permeability (m³/m². day . atm)[2] |
|---|---|---|---|---|
| 100 | 0 | W/O | — | 1.0 |
| 95 | 5 | W/O | 9 | 1.0 |
| 90.5 | 9.5 | W/O | 8 | 0.96 |
| 86.3 | 13.7 | W/O | 10 | 0.90 |
| 82.6 | 17.4 | W/O | 10 | 0.90 |

TABLE 1-continued

| Oil[1] (% by weight) | Water (% by weight) | Type of Emulsion | Average Diameter of Emulsion Particles (μm) | Oil Permeability (m$^3$/m$^2$ · day · atm)[2] |
|---|---|---|---|---|
| 75.0 | 25.0 | W/O | 15 | 0.52 |
| 50.0 | 50.0 | O/W | 20 | 0.48 |
| 10.0 | 90.0 | O/W | 15 | 0.48 |

Note
[1] The viscosity of the oil was 54 centistokes as measured at 20° C.
[2] Operating pressure = 2 atm.

EXAMPLE 3

Using the same polyethylene hollow fiber porous membrane as used in Example 2, an oil-containing emulsion composed of 10 parts by weight of liquid paraffin as the oil and 90 parts by weight of water (type of emulsion: O/W, average diameter of oil particles=5 μm) was subjected to oil-water separation in the same manner as described in Example 2. The oil permeated selectively through the porous membrane. The oil permeability of the porous membrane was 0.08 m$^3$/m$^2$·day·atm. The water content in the separated oil was below 3 ppm.

EXAMPLE 4 AND COMPARATIVE EXAMPLE 2

A polyethylene hollow fiber porous membrane was prepared in substantially the same manner as described in Example 2 except that 23 weight percent of SUN-TEC S-360P was used instead of 22 weight percent of the same and 23 weight percent of NIPSIL VN-3 was used instead of 24 weight percent of the same.

The hollow fiber porous membrane thus obtained had an external diameter of 0.13 cm, a membrane thickness of 200 μm, a maximum pore diameter of 0.35 μm, an average pore diameter of 0.1 μm, a $\gamma_c$ of 31 dynes/cm, a porosity of 58.0%, a pore radius distribution ($\bar{r}_4/\bar{r}_3$) of 1.3 and a pore diameter ratio of 1.0.

Using the polyethylene hollow fiber porous membrane, oil-containing emulsion composed of SUPER-HYRANDO 22, NISSAN NONION NS 206 (trade name of a nonion surface active agent sold by Nihon Yushi Kabushiki Kaisha, Japan) and water and having a varied composition as indicated in Table 2 were each subjected to oil-water separation by flowing the emulsions through the hollow fiber at a linear velocity as indicated in Table 2 at 35° C. The materials and the results are listed in Table 2.

TABLE 2

| | Oil (% by weight) | Surface active Agent (mole/liter) | Type of Emulsion | Linear Velocity (cm/sec) | Liquid Permeability (m$^3$/m$^2$ · day · atm) |
|---|---|---|---|---|---|
| Present Invention | 90 | 0 | W/O | 50 | 0.92 |
| Present Invention | 90 | 8.5×10$^{-5}$ | W/O | 50 | 0.90 |
| Present Invention | 90 | 1.8×10$^{-4}$ | W/O | 50 | 0.93 |
| Present Invention | 90 | 2.6×10$^{-4}$ | W/O | 50 | 0.94 |
| Present Invention | 90 | 3.4×10$^{-4}$ | W/O | 40 | 0.87 |
| Present Invention | 90 | 4.3×10$^{-4}$ | W/O | 60 | 0.90 |
| Present Invention | 90 | 5.0×10$^{-4}$ | W/O | 50 | 0.95 |
| Present Invention | 80 | 0 | W/O | 80 | 0.90 |

TABLE 2-continued

| | Oil (% by weight) | Surface active Agent (mole/liter) | Type of Emulsion | Linear Velocity (cm/sec) | Liquid Permeability (m$^3$/m$^2$ · day · atm) |
|---|---|---|---|---|---|
| Present Invention | 80 | 8.5×10$^{-5}$ | W/O | 70 | 1.02 |
| Present Invention | 80 | 1.8×10$^{-4}$ | W/O | 60 | 0.86 |
| Present Invention | 80 | 2.6×10$^{-4}$ | W/O | 80 | 0.86 |
| Present Invention | 80 | 3.4×10$^{-4}$ | W/O | 60 | 0.86 |
| Present Invention | 80 | 4.3×10$^{-4}$ | W/O | 70 | 0.80 |
| Present Invention | 80 | 5.0×10$^{-4}$ | W/O | 80 | 0.76 |
| Present Invention | 70 | 0 | W/O | 90 | 0.82 |
| Present Invention | 70 | 8.5×10$^{-5}$ | W/O | 100 | 0.82 |
| Present Invention | 70 | 1.8×10$^{-4}$ | W/O | 120 | 0.82 |
| Present Invention | 70 | 2.6×10$^{-4}$ | W/O | 130 | 0.82 |
| Present Invention | 70 | 3.4×10$^{-4}$ | W/O | 120 | 0.72 |
| Present Invention | 60 | 0 | W/O | 150 | 0.70 |
| Present Invention | 60 | 8.5×10$^{-5}$ | W/O | 150 | 0.60 |
| Present Invention | 60 | 1.8×10$^{-4}$ | W/O | 150 | 0.56 |
| Present Invention | 50 | 0 | O/W | 170 | 0.45 |
| Comparative | 50 | 4.0×10$^{31}$ 5 | O/W | 170 | Permeated liquid was not substantially of oil alone |
| Comparative | 50 | 8.5×10$^5$ | O/W | 170 | |

Note
1. In each emulsion, the average diameter of emulsion particles was more than 0.5 μm.
2. Operating pressure = 1.5 atm.
3. The balance in the composition of each emulsion was water.

In all cases falling within the scope of the present invention, the oil permeated selectively through the porous membrane and the water content in the separated oil was below the saturation solubility of water in the oil, i.e., below 3 ppm.

EXAMPLE 5

A polyethylene hollow fiber porous membrane was prepared in substantially the same manner as described in Example 2 except that 23 weight percent of SUN-TEC S-360P was used instead of 22 weight percent of the same and 53 weight percent of DOP was used instead of 54 weight percent of the same.

The hollow fiber porous membrane thus obtained had an external diameter of 0.17 cm, a membrane thickness of 400 μm, a maximum pore diameter of 0.4 μm, an average pore diameter of 0.08 μm, a $\gamma_c$ of 31 dynes/cm, a porosity of 56.0%, a pore radius distribution ($\bar{r}_4/\bar{r}_3$) of 1.3, a water permeability of 12 m$^3$/m$^2$·day·atm and a pore diameter ratio of 1.0.

Using the polyethylene hollow fiber porous membrane, oil-containing emulsions composed of 60 parts by weight of SUPERHYRANDO 22, 40 parts by weight of water and 1.0×10$^{-4}$ mole/liter of a respective surface active agent as indicated in Table 3 were each subjected to oil-water separation by flowing the emulsions through the hollow fiber at a linear velocity as indicated in Table 3 at 35° C. under an operating pressure of 2.5 atm. The materials and the results are listed in Table 3.

TABLE 3

| Surface active Agent | Type of Emulsion | Linear Velocity (cm/sec) | Oil Permeability ($m^3/m^2$ . day . atm) |
|---|---|---|---|
| Anion A | W/O | 100 | 0.77 |
| Anion B | W/O | 110 | 0.78 |
| Cation A | W/O | 100 | 0.79 |
| Cation B | W/O | 90 | 0.77 |
| Nonion A | W/O | 100 | 0.80 |
| Nonion B | W/O | 120 | 0.79 |
| Amphoteric | W/O | 110 | 0.79 |

Note
1. "Anion A": NEOPELEX F-60 [trade name of an anion surface active agent (sodium dodecylbenzenesulfonate) manufactured and sold by Kao Atlas Co., Ltd., Japan].
2. "Anion B": EMAL NC [trade name of an anion surface active agent (sodium polyoxyethylene-alkylphenol-ether-sulfonate) manufactured and sold by Kao Atlas Co., Ltd., Japan].
3. "Cation A": ACETAMIN 24 [trade name of a cation surface active agent (laurylamine acetate type) manufactured and sold by Kao Atlas Co., Ltd., Japan].
4. "Cation B": QUTAMIN 24P [trade name of a cation surface active agent (lauryltrimethylamine ammonium chloride) manufactured and sold by Kao Atlas Co., Ltd., Japan].
5. "Nonion A": EMULGEN 105 [trade name of a nonion surface active agent (polyoxyethylene lauryl ether) manufactured and sold by Kao Atlas Co., Ltd., Japan].
6. "Nonion B": EMULGEN 903 [trade name of a nonion surface active agent (polyoxyethylene nonylphenol ether) manufactured and sold by Kao Atlas Co., Ltd., Japan]
7. "Amphoteric ": AMPHTOL 24B [trade name of an amphoteric surface active agent (laurylbetaine) manufactured and sold by Kao Atlas Co., Ltd., Japan].

In all cases, the oil permeated selectively through the porous membrane and the water content in the separated oil was below the saturation solubility of water in the oil, i.e., below 4 ppm. In every emulsion, the average diameter of emulsion particles was more than 0.5 $\mu$m.

COMPARATIVE EXAMPLE 3

2,200 Hollow fibers of a polyacrylonitrile semipermeable membrane [external diameter=1.4 mm, internal diameter=0.8 mm, average pore diameter=100 Å, porosity=74% pore radius distribution ($\bar{r}_4/\bar{r}_3$)=1.4, pore diameter ratio=1.3, $\gamma_c$=51 dynes/cm, water permeability=180 $m^3/m^2$·day·atm] obtained by wet-spinning a polyacrylonitrile copolymer (methyl acrylate: 10 weight percent, weight average molecular weight=90,000) into an aqueous nitric acid solution were fixed at their respective both end portions by means of fixation blocks of an epoxy resin to form an assembly of ultrafiltration membranes. The assembly thus formed had an effective filtration length of 800 mm and the openings of both ends of the respective hollow fibers were exposed. The assembly was accommodated in a casing in such a manner that the openings of both ends of the hollow fibers opened to the outside of the casing and that the respective hollow fibers were arranged loosely at their intermediate potions, leaving spacings between the respective hollow fibers.

Using the assembly thus accomodated in the casing, an oil-containing emulsion composed of 60 parts by weight of SUPERHYRANDO 22, 40 parts by weight of water and $1.0 \times 10^{-4}$ mole/liter of NISSAN NONION NS 206 as the surface active agent (type of emulsion: W/O, average diameter of water particles=5 $\mu$m) was subjected to oil-water separation by flowing the emulsion through the assembly at a linear velocity of 150 cm/sec at 35° C. under an operating pressure at 1 atm. The liquid permeability of the assembly was 3.0 liters/min. The permeated liquid was an O/W type emulsion.

Using the same hollow fiber of the polyacrylonitrile semi-permeable membrane as used above, the same emulsion as used above was subjected to oil-water separation in the same manner as described above. The liquid permeability of the semi-permeable membrane was 1 $m^3/m^2$·day·atm which was below one-tenth as low as those of polyethylene porous membranes as used in Examples falling within the scope of the present invention. The permeated liquid was composed of 10 parts by weight of water and 3 parts by weight of the oil.

EXAMPLE 6

Using the same hollow fiber porous membrane as used in Example 2, a W/O type emulsion composed of 60 parts by weight of SUPERHYRANDO 22, 40 parts by weight of water and $8.5 \times 10^{-5}$ mole/liter of NISSAN NONION NS 206 as the surface active agent (average diameter of water particles=8 $\mu$m) was subjected to oil-water separation by flowing the emulsion at a linear velocity as indicated in Table 4 at 35° C. under an operating pressure as indicated in Table 4. The results are shown in Table 4.

TABLE 4

| Operating Pressure (atm) | Linear Velocity (cm/sec) | Oil Permeability ($m^3/m^2$ . day . atm) |
|---|---|---|
| 1.0 | 1.0 | 0.30 |
| 2 | 20.0 | 0.60 |

From the results, it is apparent that the higher the linear velocity and the operating pressure, the larger the oil permeability is.

EXAMPLE 7

Polyethylene hollow fiber porous membranes having a varied pore diameter ratio of more than 1 were prepared in substantially the same manner as described in Example 2 except that co-extrusion was carried out.

MEMBRANE 1

The same polyethylene hollow fiber porous membrane as prepared in Example 2.

MEMBRANE 2

Blend A: the same blend as prepared in Example 1.
Blend B: a blend composed of 22 weight percent of SUNTEC B-180 [trade name of polyethylene manufactured and sold by Asahi Kasei Kogyo Kabushiki Kaisha, Japan ($\overline{M}w$=250,000)], 54 weight percent of DOP and 24 weight percent of NIPSIL VN-3.
The co-extrusion of the blend A and the blend B (volume ratio=1:1) was carried out so that the blend A constituted the external portion of the wall of the hollow fiber and the blend B constituted the internal portion of the wall of the hollow fiber.

MEMBRANE 3

Blend A: the same blend as prepared in Example 1.
Blend C: a blend composed of 22 weight percent of 5091P [trade name of polyethylene manufactured and sold by Wacker AG, West Germany ($\overline{M}w$=330,000)], 54 weight percent of DOP and 24 weight percent of NIPSIL VN-3.
The co-extrusion of the blend A and the blend C (volume ratio=1:1) was carried out so that the blend A constituted the external portion of the wall of the hollow fiber and the blend C constituted the internal portion of the wall of the hollow fiber.

These hollow fiber porous membranes obtained had an external diameter of 1.3 mm, a membrane thickness of 200 μm, a maximum pore diameter of 0.35 μm and a $\gamma_c$ of 31 dynes/cm.

Using each of the polyethylene hollow fiber porous membranes, a W/O type emulsion composed of 90 parts by weight of SUPERHYRANDO 22 and 10 parts by weight of water (average diameter of water particles = 5 μm) was subjected to oil-water separation by flowing the emulsion at a linear velocity as indicated in Table 5 at 40° C. under an operating pressure of 1.5 atm. The materials and results are listed in Table 5.

TABLE 5

| Membrane | Pore Diameter Ratio | Average Pore Diameter (μm) | Porosity (%) | $\bar{r}_4/\bar{r}_3$ | Linear Velocity (cm/sec) | Oil Permeability ($m^3/m^2$ . day . atm) |
|---|---|---|---|---|---|---|
| 1 | 1.0 | 0.1 | 62.6 | 1.3 | 100 | 0.96 |
| 2 | 1.7 | 0.1 | 70.0 | 1.4 | 100 | 1.2 |
| 3 | 2.0 | 0.1 | 72.0 | 1.4 | 100 | 1.3 |

From the results, it is apparent that the larger the pore diameter ratio, the larger the oil permeability is.

EXAMPLE 8

Using the same polyethylene hollow fiber porous membrane as used in Example 2, a W/O type emulsion composed of 80 parts by weight of SUPERHYDRANDO 22, 20 parts by weight of a mixture of methanol-water (⅓ by weight) and $1.8 \times 10^{-4}$ mole/liter of NISSAN NONION NS 206 as the nonion surface active agent (average diameter of emulsion particles = 0.5 μm) was subjected to separation of the oil from the mixture by flowing the emulsion through the porous membrane at a linear velocity of 150 cm/sec at 40° C. under an operating pressure of 1.5 atm. The oil permeated selectively through the porous membrane. The content of the mixed solution of water-methanol in the oil was below 2 ppm.

EXAMPLE 9

Using the same polyethylene hollow fiber porous membrane as used in Example 2, a W/O type emulsion composed of 80 parts by weight of benzene as the oil, 20 parts by weight of water and $1 \times 10^{-4}$ mole/liter of NISSAN NONION NS 206 as the nonion surface active agent (average diameter of water particles = 0.6 μm) was subjected to oil-water separation by flowing the emulsion through the porous membrane at a linear velocity of 150 cm/sec at 40° C. under an operating pressure of 1.5 atm. The benzene permeated selectively through the porous membrane.

COMPARATIVE EXAMPLE 4

25 Parts by weight of KYNAR (trade name of polyvinylidene fluoride manufactured and sold by Pennwalt Company, U.S.A.) were dissolved in 75 parts by weight of dimethylformamide to form a solution. A hollow fiber porous membrane (ultrafiltration membrane) was prepared from the solution as follows. The extrusion was carried out in substantially the same manner as described in Example 2. A 20° C. water as a solidifying medium was put into the interior of a hollow fiber simultaneously with the extrusion of the hollow fiber which was extruded into a 20° C. water as the solidifying medium. The hollow fiber was subjected to 1.5-time stretching and to heat-fixation at 150° C. for 5 minutes to obtain the finished hollow fiber porous membrane.

The hollow fiber porous membrane obtained had an external diameter of 0.13 cm, a membrane thickness of 200 μm, a $\gamma_c$ of 25 dynes/cm, an average pore diameter of 100 Å, a maximum pore diameter of 200 Å, a porosity of 20%, a pore radius distribution ($\bar{r}_4/\bar{r}_3$) of 1.2 and a pore diameter ratio of 1.2.

Using the hollow fiber porous membrane, a W/O type emulsion composed of 60 parts by weight of SUPERHYDRANDO 22, 40 parts by weight of water and $1 \times 10^{-4}$ mole/liter of NISSAN NONION NS 206 as the nonion surface active agent (average diameter of water particles = 0.5 μm) was subjected to oil-water separation by flowing the emulsion through the porous membrane at a linear velocity of 20 cm/sec at 35° C. under an operating pressure of 1 atm. The oil permeability of the porous membrane was $1 \times 10^{-4}$ $m^3/m^2$·day·atm.

EXAMPLE 10 AND COMPARATIVE EXAMPLE 5

The oil-water separation of the same emulsion as used in Comparative Example 4 was conducted using each of porous films and a hollow fiber porous membrane as described below.

(i) Porous film

25 Parts by weight of KYNAR were dissolved into 75 parts by weight of N-methyl-2-pyrrolidone. The resulting solution was heated to 60° C., cast on a glass plate using a doctor blade of 500 μm and allowed to stand in air for one minute to form a film. The film was separated from the glass plate. The film was dipped in a 70° C. warm water for 2 minutes and then dipped in a 20° C. water to form a porous film. The porous film was subjected to 2-time biaxial stretching and to heat fixation at 150° C. for 5 minutes to form the finished porous film. The porous film thus obtained had a thickness of 180 μm, a maximum pore diameter of 0.1 μm, an average pore diameter of 0.06 μm, a porosity of 79.0%, a pore radius distribution ($\bar{r}_4/\bar{r}_3$) of 1.4, a $\gamma_c$ of 25 dynes/cm, a water permeability of 7.5 $m^3/m^2$·day·atm and a pore diameter ratio of 1.2.

(ii) Hollow fiber porous membrane

22 Weight percent of NOBLEN Y 101 [trade name of polypropylene manufactured and sold by Sumitomo Kagaku Kabushiki Kaisha, Japan ($\bar{M}w = 220,000$, $\bar{M}n = 35,000$)], 54 weight percent of dioctyl phthalate (DOP) and 24 weight percent of NIPSIL VN-3 were mixed in a Henschel mixer. By a twin extruder having a diameter of 30 mm, the blend was kneaded, extruded and pelletized. A polypropylene hollow fiber porous membrane was prepared from these pellets in substantially the same manner as describrd in Example 2. The polypropylene hollow fiber porous membrane thus obtained had an external diameter of 0.14 cm, a membrane thickness of 200 μm, a maximum pore diameter of 0.20 μm, an average pore diameter of 0.07 μm, a porosity of 61.2%, a pore radius distribution ($\bar{r}_4/\bar{r}_3$) of 1.4, a $\gamma_c$ of 29.0 dynes/cm, a water permeability of 6.0 m³/m²·day·atm and a pore diameter ratio of 1.2.

(iii) Porous film

NUCLEPORE N 010 [trade name of a polycarbonate porous film manufactured and sold by Nuclepore Corp., U.S.A. (thickness=5 μm, maximum pore diameter=0.4 μm, average pore diameter=0.1 μm, porosity=20%, $\bar{r}_4/\bar{r}_3$=1.1, $\gamma_c$=34.5 dynes/cm, water permeability=60 m³/m²·day·atm, pore diameter ratio=1.1)].

(iv) Porous film

Nylon 6, 10 (intrinsic viscosity in conc. $H_2SO_4$=2.5 dl/g) was dissolved in nitric acid (specific gravity=1.46) maintained at −5° C. so that the concentration of the nylon 6, 10 was 15 g/100 ml of the nitric acid. The resulting polyamide dope was cast on a glass plate using a doctor blade of 0.3 mm and immediately dipped in a 10° C. aqueous solidifying medium containing 0.1% by weight of sodium oleylsulfate (surface active agent) to form a film. The film was washed with flowing water for one hour to form a porous film (semi-permeable membrane). The porous film thus obtained had a thickness of 0.2 mm, a maximum pore diameter of 0.6 μm, an average pore diameter of 0.17 μm, a porosity of 75.0%, a pore radius distribution ($\bar{r}_4/\bar{r}_3$) of 1.4, a $\gamma_c$ of 37.0 dynes/cm, a water permeability of 20.0 m³/m²·day·atm and a pore diameter ratio of 1.2.

(v) Porous film

15 Parts by weight of polyvinyl chloride ($\bar{M}_n$=1,100) manufactured by Nippon Zeon Co., Ltd., Japan were dissolved into 85 parts by weight of dimethylformamide to form a uniform polymer solution. The polymer solution was cast on a glass plate using a doctor blade, allowed to stand for 1 minute and dipped in water to form a porous film. The porous film thus obtained had a thickness of 200 μm, a maximum pore diameter of 0.5 μm, an average pore diameter of 0.10 μm, a porosity of 75%, a pore radius distribution ($\bar{r}_4/\bar{r}_3$) of 1.5, a $\gamma_c$ of 39.0 dynes/cm, a water permeability of 14.4 m³/m²·day·atm and a pore diameter ratio of 1.5.

When the polyvinylidene fluoride, polycarbonate, nylon 6, 10 and polyvinyl chloride porous films were used, the oil-water separation was conducted in substantially the same manner as in Example 1 under the same temperature and pressure condition as in Comparative Example 4 while stirring the emulsion at a maximum linear velocity of 20 cm/sec. When the polypropylene hollow fiber porous membrane was used, the oil-water separation was conducted in the same manner as described in Comparative Example 4.

In every case falling within the scope of the present invention, the oil permeated selectively through the porous film or membrane. In every case falling outside the scope of the present invention, the permeated oil was contaminated with water. The results are shown in Table 6.

TABLE 6

| | | $\gamma_c$ (dyne/cm) | Liquid Permeability (m³/m² . day . atm) |
|---|---|---|---|
| Present Invention | (i) Porous film (polyvinylidene fluoride) | 25.0 | 0.8 |
| Present Invention | (ii) Porous membrane (polypropylene) | 29.0 | 0.7 |
| Present Invention | (iii) Porous film (polycarbonate) | 34.5 | 10 |
| Comparative | (iv) Porous film (nylon 6, 10) | 37.0 | 15 |

TABLE 6-continued

| | | $\gamma_c$ (dyne/cm) | Liquid Permeability (m³/m² . day . atm) |
|---|---|---|---|
| Comparative | (v) porous film (polyvinyl chloride) | 39.0 | 1.5 |

EXAMPLE 11

Using the same polyethylene hollow fiber porous membrane as used in Example 2, the same emulsion as used in Comparative Example 4 was subjected to oil-water separation by flowing the emulsion at a linear velocity as indicated in Table 7 at a temperature as indicated in Table 7 under an operating pressure of 1 atm. The data of oil permeability are shown in Table 7.

TABLE 7

| Linear Velocity (cm/sec) | Temperature (°C.) | Oil Permeability (m³/m² . day . atm) |
|---|---|---|
| 10 | 0 | 0.1 |
| 15 | 5 | 0.2 |
| 25 | 10 | 0.3 |
| 30 | 15 | 0.35 |
| 40 | 20 | 0.38 |
| 50 | 25 | 0.40 |
| 60 | 30 | 0.80 |
| 90 | 35 | 1.5 |
| 100 | 40 | 2.5 |
| 120 | 45 | 3.0 |
| 140 | 50 | 5.0 |
| 180 | 60 | 8.0 |
| 260 | 70 | 9.0 |
| 300 | 80 | 10.0 |

It is apparent from Table 7 that the oil permeability of the porous membrane is increased as the temperature and linear velocity are increased.

EXAMPLE 12

Using the same polyvinylidene fluoride porous film as used in Example 10, a W/O type emulsion composed of 60 parts by weight of n-heptane as the oil, 40 parts by weight of methanol and 1×10⁻⁴ mole/liter of TWEEN 80 [trade name of a nonion surface active agent (polyoxyethylene sorbitan monooleate) manufactured and sold by Kao Atlas Co., Ltd., Japan] (average diameter of methanol particles=0.5 μm) was subjected to oil-methanol separation in substantially the same manner as described in Example 1 except that the maximum linear velocity of the emulsion was 50 cm/sec and the operating pressure was 5 atm. The n-heptane permeated selectively through the porous film.

EXAMPLE 13

Using the same polyvinylidene fluoride porous film as used in Example 10, a W/O type emulsion composed of 60 parts by weight of n-hexane as the oil, 40 parts by weight of methanol and 1×10⁻⁴ mole/liter of TWEEN 80 as the surface active agent (average diameter of methanol particles=0.2 μm) was subjected to oil-methanol separation in substantially the same manner as described in Example 1 except that the maximum linear velocity of the emulsion was 100 cm/sec and the operating pressure was 1 atm. The n-hexane permeated selectively through the porous film. The oil permeability of the porous film was 10 m³/m²·day·atm.

EXAMPLE 14

40 Weight percent of TEFZEL (trade name of ethylenetetrafluoroethylene copolymer manufactured and sold by Du Pont Company, U.S.A.), 40 weight percent of dioctyl phthalate (DOP) and 20 weight percent of NIPSIL VN-3 (finely divided silica) were mixed in a Henschel mixer. By a twin extruder having a diameter of 30 mm, the blend was kneaded, extruded and pelletized. These pellets were extruded to form a film using a film making apparatus including a twin extruder of 30 mm diameter having a T-die of 450 mm width attached thereto.

The extruded film was immersed in CHLOROTHENE VG (1,1,1-trichloroethane) for 5 minutes to extract DOP, followed by drying at 85° C. for 2 minutes by the use of a metal roll with a flannel wound thereround. Subsequently, the film was immersed in a 40% aqueous solution of sodium hydroxide at 50° C. for 30 minutes to extract the finely divided silica, followed by drying at 85° C. for 10 minutes by the use of a metal roll with a flannel wound therearound. The amounts of the DOP and the finely divided silica remaining unextracted from the film were both 0.1 weight percent based on the weight of the film. The shrinkages of the film due to the extraction of the DOP and the finely divided silica were 3.5% in a longitudinal direction (direction of extrusion), 2.3% in a lateral direction and 1.8% in a thicknesswise direction.

The porous film thus obtained had a thickness of 180 $\mu$m, a maximum pore diameter of 0.2 $\mu$m, an average pore diameter of 0.08 $\mu$m, a porosity of 60%, a pore radius distribution ($\bar{r}_4/\bar{r}_3$) of 1.4, a $\gamma_c$ of 26.5 dynes/cm, a water permeability of 10 m$^3$/m$^2$·day·atm and a pore diameter ratio of 1.2.

Using the porous film and the same emulsion as used in Example 1, the oil-water separation was conducted in the same manner as described in Example 1. The oil permeability of the porous film was 0.3 m$^3$/m$^2$·day·atm. The water content in the permeated oil was below 3 ppm.

EXAMPLE 15 AND COMPARATIVE EXAMPLE 6

27 g of P-1700 (trade name of polysulfone manufactured and sold by Union Carbide Corp., U.S.A.) and 23 g of PVP K-15 (trade name of polyvinyl pyrrolidone manufactured and sold by G.A.F. Corp., U.S.A.) was dissolved into 100 ml of N-dimethylacetamide. The resulting solution was cast on a glass plate using a doctor blade of 500 $\mu$m and was then dipped in a 30° C. water to obtain a porous film.

The porous film thus obtained had a thickness of 150 $\mu$m, a maximum pore diameter of 0.1 $\mu$m, an average pore diameter of 0.05 $\mu$m, a porosity of 82%, a pore radius distribution ($\bar{r}_4/\bar{r}_3$) of 1.4, a $\gamma_c$ of 41 dynes/cm, a water permeability of 7.0 m$^3$/m$^2$·day·atm and a pore diameter ratio of 1.4.

The polysulfone porous film was placed at a distance of 30 cm above a tungsten boat in a vacuum deposition machine. 0.5 g of POLYFLON (trade name of polytetrafluoroethylene manufactured and sold by Daikin Kogyo Kabushiki Kaisha, Japan) was put into the tungsten boat and then vacuum-deposited on the polysulfone porous film to effect surface coating. There were prepared five kinds of porous films having a varied thickness of the polytetrafluoroethylene coating, i.e., 10 Å, 50 Å, 100 Å, 300 Å and 500 Å, respectively. With respect to each of the porous films having the polytetrafluoroethylene coating, it was confirmed by visual observation using an electron microscope that there was no substantial change of pore diameter. The data of $\gamma_c$ of the porous films are listed in Table 8.

Using each of the polysulfone porous films with the polytetrafluoroethylene coating and the same emulsion as used in Example 1, the oil-water separation was conducted in the same manner as described in Example 1. For comparison, substantially the same procedures as above were repeated without the polytetrafluoroethylene coated. The results are shown in Table 8.

TABLE 8

|  | Coating Tickness (Å) | $\gamma_c$ (dyne/cm) | Permeated Liquid | Liquid Permeability (m$^3$/m$^2$ . day . atm) |
| --- | --- | --- | --- | --- |
| Comparative | no coating | 41 | Emulsion | 4 |
| Comparative | 10 | 37 | of water | 3 |
| Comparative | 50 | 35 | and oil | 0.1 |
| Present Invention | 100 | 30 | oil | 0.08 |
| Present Invention | 300 | 22 | oil | 1.0 |
| Comparative | 500 | 19 | None | 0 |

Note
1. In both cases falling within the scope of the present invention, the water content in the separated oil was below 3 ppm.

What is claimed is:

1. A method of selectively permeation-separating an oil from an oil-containing liquid which comprises: contacting an oil-containing liquid selected from a water-in-oil type emulsion comprising an oil and a liquid other than the oil and an oil-in-water type emulsion comprising an oil and a liquid other than the oil with the surface of a polymeric porous membrane having pores which form passages running through the membrane from one surface thereof to the other surface thereof, said porous membrane having at its surface a critical surface tension ($\gamma_c$) of less than 35 dynes/cm to not less than 20 dynes/cm, and having an average pore diameter ($2\bar{r}$) of 0.03 $\mu$m to 5 $\mu$m, a pore radius distribution ($\bar{r}_4/\bar{r}_3$) of not more than 1.5 and a porosity of 1 to 85%, the average pore radius of the porous membrane ($\bar{r}$) and the average particle radius ($\bar{r}_E$) of particles dispersed in the water-in-oil type emulsion or the oil-in-water type emulsion having therebetween a relationship represented by the formula $2\bar{r}_E \geq \bar{r}$, thereby causing said oil to permeate through said porous membrane.

2. A method according to claim 1, wherein said critical surface tension ($\gamma_c$) is not more than 33 dynes/cm to not less than 20 dynes/cm.

3. A method according to claim 1, wherein said porous membrane is made of a resin containing, as a main component, at least one member selected from the group consisting of polyethylene, polypropylene, a halogenated polyethylene having at least one fluorine atom, a halogenated polypropylene having at least one fluorine atom, polycarbonate and polyphenylene oxide.

4. A method according to claim 1, wherein said porous membrane is made of a copolymer of two or three kinds of monomers selected from ethylene, propylene and tetrafluoroethylene.

5. A method according to claim 1, wherein the average pore diameter ($2\bar{r}$) of said porous membrane is 0.05 μm to 1 μm.

6. A method according to claim 1, wherein the average particle radius ($\bar{r}_E$) is 0.1 μm to 50 μm.

7. A method according to claim 1, wherein said oil-containing liquid is contacted with the surface of the porous membrane at a temperature 10° C. or more lower than the boiling point of the oil or the liquid other than the oil, whichever it is lower, provided that the temperature is within the range of 35° to 90° C.

8. A method according to claim 1, wherein said oil-containing liquid is contacted with the surface of the porous membrane by flowing said liquid over said surface at a linear velocity of 1 cm/sec to 500 cm/sec.

9. A method according to claim 1, wherein said oil-containing liquid is contacted with the surface of the porous membrane while applying to the porous membrane a pressure of 1 atm to 10 atm.

10. The method of claim 1 in which said oil-containing liquid is a water-in-oil type emulsion, which emulsion contains a surface active agent.

* * * * *